(12) United States Patent
Kobrinsky et al.

(10) Patent No.: US 7,120,817 B2
(45) Date of Patent: Oct. 10, 2006

(54) METHOD OF SIGNAL DISTRIBUTION BASED ON A STANDING WAVE WITHIN A CLOSED LOOP PATH

(75) Inventors: Mauro J. Kobrinsky, Hillsboro, OR (US); Sourav Chakravarty, Hillsboro, OR (US); R. Scott List, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 10/447,706

(22) Filed: May 29, 2003

(65) Prior Publication Data
US 2004/0243873 A1     Dec. 2, 2004

(51) Int. Cl.
*G06F 1/04* (2006.01)
(52) U.S. Cl. .................. 713/503; 713/500; 713/502
(58) Field of Classification Search ................ 713/500, 713/501, 502, 503
See application file for complete search history.

(56) References Cited

U.S. PATENT DOCUMENTS

| | | | | |
|---|---|---|---|---|
| 5,180,877 A | * | 1/1993 | Kunimoto | 84/624 |
| 5,764,598 A | * | 6/1998 | Okayasu | 368/120 |
| 6,011,977 A | * | 1/2000 | Brown et al. | 455/503 |
| 6,530,006 B1 | * | 3/2003 | Dodd et al. | 711/167 |
| 2003/0042947 A1 | * | 3/2003 | Demone | 327/156 |
| 2003/0062936 A1 | * | 4/2003 | Kennedy et al. | 327/158 |
| 2003/0098746 A1 | * | 5/2003 | Aikawa et al. | 331/56 |
| 2003/0201814 A1 | * | 10/2003 | Braunisch et al. | 327/291 |

OTHER PUBLICATIONS

Bussman, M., and Langmann U., "Active Compensation of Interconnect Losses for Multi-GHz Clock Distribution Networks," IEEE Trans. on Circuits and Sys. II, vol. 39, 1057, 1992.
Chi, Vernon L., "Salphasic Distribution of Clock Signals for Synchronous Systems," IEEE Transactions on Computers, vol. 43, No. 5, May 1994.
Homma, N., and Goto, E., "A High-Speed Clock Distributing System Using Guarded Transmission Lines," IEEE, pp. 323-326, 1995.
O'Mahony, F., and Wong, S., "10 GHz Clock Distribution Using Standing Waves," Integrated Circuits Laboratory (ICL), Standford University, EE 310 Seminar, Apr. 12, 2002.

\* cited by examiner

*Primary Examiner*—Malcolm D. Cribbs
(74) *Attorney, Agent, or Firm*—Schwabe, Williamson & Wyatt, P.C.

(57) ABSTRACT

A closed-loop based timing signal distribution architecture includes at least one signal source coupled to a signal path disposed in a closed loop arrangement to facilitate generation of a standing wave signal within the signal path. In one embodiment, at least one receiver is coupled to the signal path to generate at least one digital clock signal based upon the standing wave signal.

24 Claims, 7 Drawing Sheets

METHOD OF SIGNAL DISTRIBUTION BASED ON A STANDING WAVE WITHIN A CLOSED LOOP PATH

BACKGROUND OF THE INVENTION

1. Field of the Invention

The present invention generally relates to the field of circuit design. More specifically, the present invention relates to a microprocessor clock signal distribution architecture.

2. Background Information

In recent years, numerous advancements in the field of microprocessor design and fabrication have enabled microprocessor clock frequencies to be continuously increased. Unfortunately however, as clock frequencies tend to increase, the absolute skew and jitter that can be tolerated by systems tends to decrease in proportion to the inverse of the clock frequency. Accordingly, the effort and expense required to meet the low skew and jitter design requirements have continued to increase along with the clock frequencies, thereby hindering and even delaying the development of faster processor chips.

FIG. 1 illustrates a simplified schematic of an H-tree clock distribution network in accordance with the prior art. As shown, H-tree clock network 100 includes clock source 102, clock receivers 104, and transmission lines 106 to distribute clock signals from clock source 102 to each clock receiver 104, which generally represents a buffer that drives a local clock distribution grid. Conventional microprocessor clock signals are typically distributed using such H-trees where each of the signal transmission lines are designed to be equal in length to avoid introduction of clock skew. Perhaps the most challenging aspect of global microprocessor clock design involves maintaining thousands of clock distribution points at the same electrical length in the presence of obstacles such as signal lines. More specifically, the balancing of the electrical lengths of thousands of branches of an H-tree, particularly in the presence of obstacles, is a major source of design complexity that is increasingly exposing designs to simulation inaccuracies and tapeout delays. However, despite the significant industry-wide work that has been invested to overcome this problem, a simplified clock distribution solution that operates within present-day power, area and design time constraints has not yet been found.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

A closed-loop based timing signal distribution architecture is described herein. The signal distribution architecture facilitates simplified, obstacle-compliant routing of clock signals to a large number of clock receivers, having increased design tolerance as compared to clock distribution approaches of the prior art. In one embodiment of the invention, a signal source is coupled to a signal path disposed in a closed loop arrangement to facilitate generation of a standing wave signal within the signal path. In one embodiment, one or more receivers are coupled to the signal path to generate one or more digital clock signals based upon the standing wave signal.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Various operations will be described as multiple discrete steps performed in turn in a manner that is helpful for understanding the present invention. However, the order of description should not be construed as to imply that these operations are necessarily performed in the order they are presented, nor even order dependent.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments. Lastly, the terms "comprising", "including", "having", and the like, as used in the present application, are intended to be synonymous.

Figure 1:
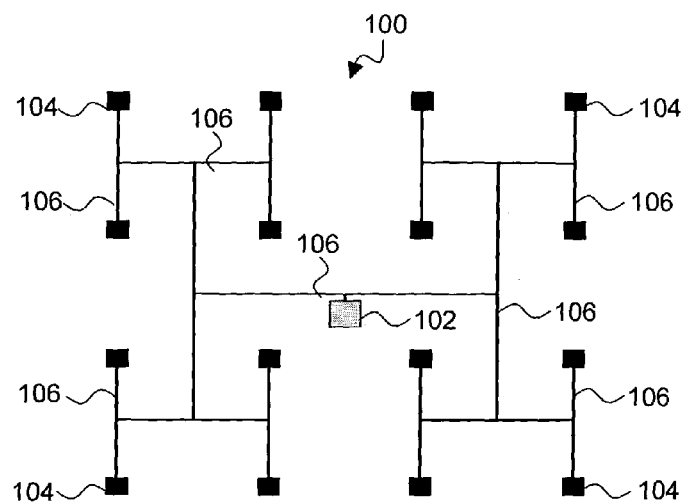
FIG. 1 illustrates a simplified schematic of an H-tree clock distribution network in accordance with the prior art.
Figure 2:
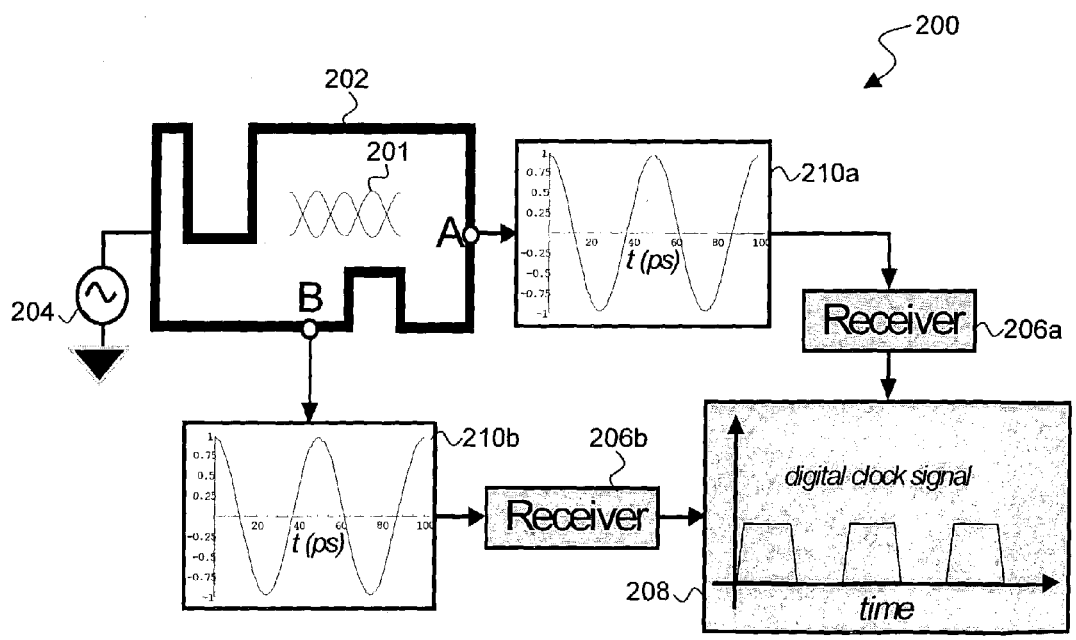
FIG. 2 illustrates clock generation circuitry 200 including a closed loop signal path for global clock distribution in accordance with one embodiment of the present invention.

FIG. 2 illustrates clock generation circuitry 200 including a closed loop signal path for global clock distribution in accordance with one embodiment of the present invention. As shown, signal source 204 is coupled to signal path 202, which is disposed in a closed loop arrangement. In one embodiment of the invention, signal source 204 represents a signal generator or driver to provide an electrical stimulus to signal path 202. In one embodiment, signal source 204 represents one or more signal sources, with each signal source being equipped to generate sinusoidal signals having one or more frequencies to be applied to signal path 202. In one embodiment, signal path 202 represents one or more interconnects such as a signal trace to carry an electrical signal from one point of a circuit to another. Signal path 202 may be formed from a wide variety of conductive materials such as copper, aluminum, silver, or gold that are disposed e.g. on the surface of, or within a printed circuit board or an integrated circuit, such as a microprocessor. In accordance with one aspect of the present invention, signal path 202 is disposed in a closed loop arrangement to facilitate generation of a standing wave 201 throughout signal path 202 in response to an applied sinusoidal signal. The expression "closed loop arrangement" as used herein is intended to broadly refer to a continuous signal path or trace having zero terminations. In one embodiment, signals provided to signal path 202 by signal source 204 divide into two identical waves travelling in opposite directions around signal path 202 so as to form standing wave 201 without the need for or use of "reflective terminations" such as circuit "opens" and "shorts".

In one embodiment of the invention, the voltage at each point of signal path 202, follows a sinusoidal wave. Accordingly, in one embodiment of the invention, the clock generation circuitry of FIG. 2 further includes one or more receivers 206a and 206b coupled to signal path 202 (e.g. as shown by points "A" and "B", respectively) to generate a digital clock signal 208, based upon standing wave 201, which provides sinusoidal signals such as 210a and/or 210b. In one embodiment, receivers 206a and 206b represent one or more of a wide variety of analog to digital (A/D) converters known in the art to convert analog signals to digital representations. The A/D converters typically provide a digital pulse when the input voltage crosses a given threshold voltage. Since the amplitude of the sinusoidal signals such as 210a and 210b differs along the closed loop, the clock pulses resulting from sinusoidal with different amplitudes would be shifted in time (i.e. skew). In one embodiment, since the amplitudes along the loop are known a-priori, such amplitude variations are compensated by introducing delay elements, which are well known in the field. In another embodiment, the skew introduced by the varying amplitudes of the sinusoidal signals such as 210a and 210b are compensated using delay elements with a magnitude that increases with the amplitude of the sinusoidal signals. In yet another one embodiment, the A/D converters are designed to be independent of the amplitude of the sinusoidal signals such as 210a and 210b. In one embodiment, the closed loop arrangement facilitates usage of voltage swings that are lower than the full digital voltage swing, which may result in appreciable power savings.

Figure 6A:
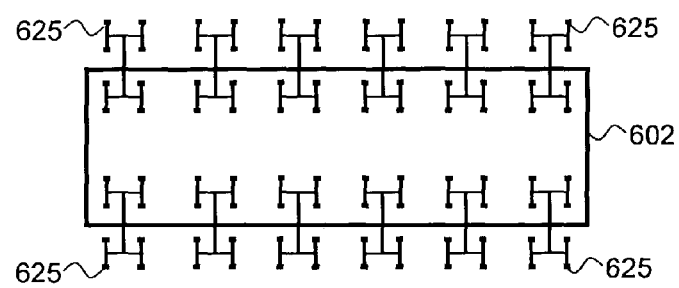
FIGS. 6a–6D illustrate a closed loop signal path coupled to one or more secondary signal distribution networks, in accordance with various embodiments of the invention.
Figure 6B:
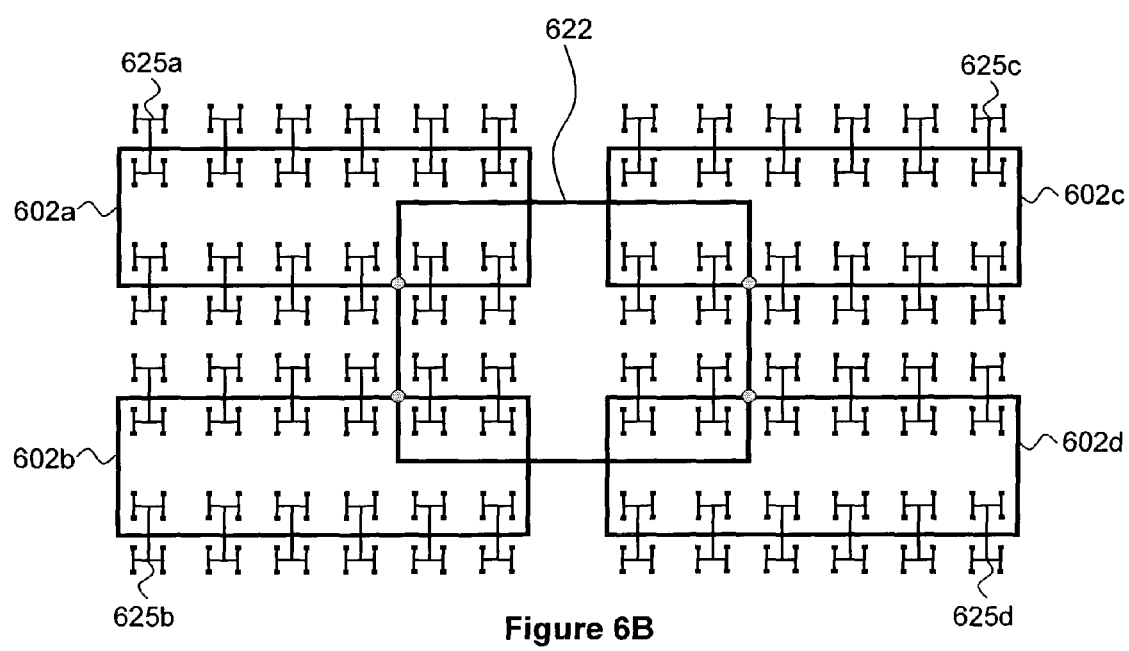
Figure 6C:
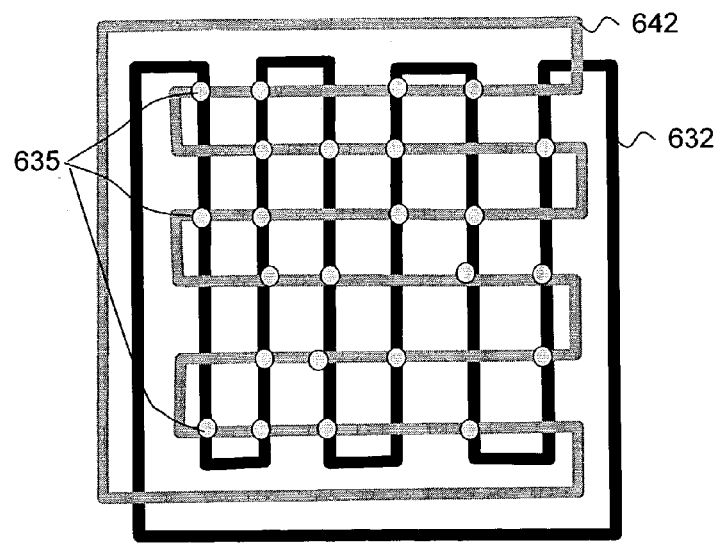

In various embodiments of the invention (e.g. as shown in FIGS. 6a–c), signal path 202 may be coupled to one or more secondary loop structures to further distribute the sinusoidal signal. Moreover, signal path 202 may be coupled to one or more H-tree based clock distribution networks in addition to one or more loop structures to distribute digital clock signal 208 to one or more local clock grids, or sequential elements of an integrated circuit.

Figure 3:
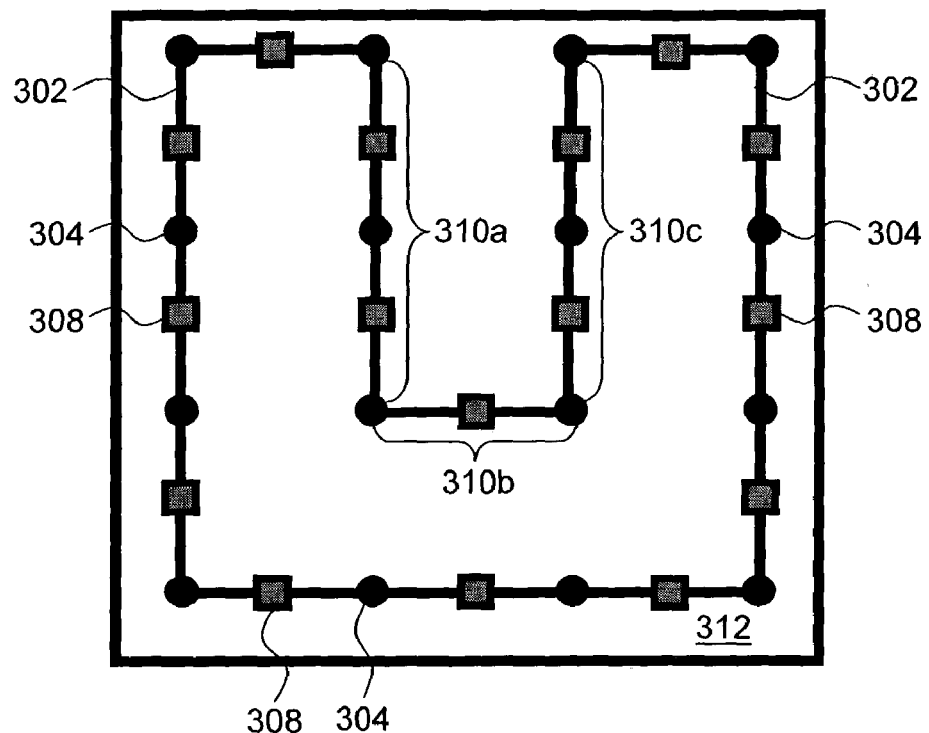
FIG. 3 illustrates an integrated circuit die containing a signal path disposed in a closed loop arrangement in accordance with one embodiment of the invention.

FIG. 3 illustrates an integrated circuit die containing a clock signal path disposed in a closed loop arrangement in accordance with one embodiment of the invention. As shown, signal path 302 is disposed on die 312 in a closed loop arrangement. Due at least in part to its closed loop nature, signal path 302 can assume an almost arbitrary shape, limited only by process limitations imposed on the particular type of interconnects utilized to form signal path 302. For example, the shape of signal path 302 need not be limited to a circular, square or rectangular based shapes, but instead can take on a wide variety of shapes and forms.

Accordingly, clock distribution networks having a closed loop arrangement can be routed around obstacles, such as existing signal lines of an integrated circuit, without requiring the lengths of one or more portions or segments of signal path 302 to be balanced. For example, segments 310a, 310b and 310c of signal path 302 need not be of equal length, although they may.

In the illustrated embodiment, signal path 302 includes multiple signal drivers 304 and multiple loss compensation circuits 308. The signal drivers 304 of signal path 302 simultaneously operate to facilitate generation of a standing sinusoidal based waveform within the closed loop structure of signal path 302. In one embodiment, each signal driver 304 operates at the same frequency and with the same phase. However, due to the nature of the closed loop arrangement of signal path 302, it is possible for the signals of any one or more of signal drivers 304 to operate between approximately 0 to 20 degrees out of phase with respect to the remaining signal drivers, while nevertheless generating a standing wave and thereby simplifying clock design even further. Thus, all points of signal path 302 (i.e. the clock line) will oscillate in phase such that there are be no position dependent clock shifts.

In accordance with one embodiment of the invention, in order to counteract signal loss potentially introduced by signal path 302, multiple loss compensation circuits 308 designed to resonate at the same frequency as signal drivers 304 are utilized. In one embodiment, Negative Impedance Compensation (NIC) circuits act as loss compensation units. In one embodiment of the invention, the number of NICs to be used to counteract signal loss may be calculated in the following manner. First, given the dimensions (e.g. thickness, width) and physical properties (e.g. resistivity, appropriate dielectric constants) of the signal path interconnects, the resistance (R), inductance (L), capacitance (C), and conductance (G) per unit length can be determined. Next, based upon a desired skew target, the acceptable loss α (where α is the attenuation constant) can be calculated. Next, the desired loss compensation (Gc, Cc) can be calculated using e.g. the following equation where more than one pair (Cc, Gc) that satisfies the equation might exist:

$$\alpha = Re[\sqrt{(R+j2\pi fL) \cdot [Gc+j2\pi f(C+Cc)]}]$$

Depending upon the loss compensation capability of the particular NIC used, the number of NICs to be used per unit length of the interconnect to achieve the calculated loss compensation (Gc, Cc) can then be determined. For example, if each NIC can compensate for 10 percent of the loss for a given loop, 10 NICs might be used. In one embodiment, die 312 is approximately 10 mm in size with signal path 302 containing one loss compensation circuit for each signal driver 304 coupled to signal path 302. In one embodiment, a combination of 16 signal drivers and 16 NICs are utilized.

Figure 4:
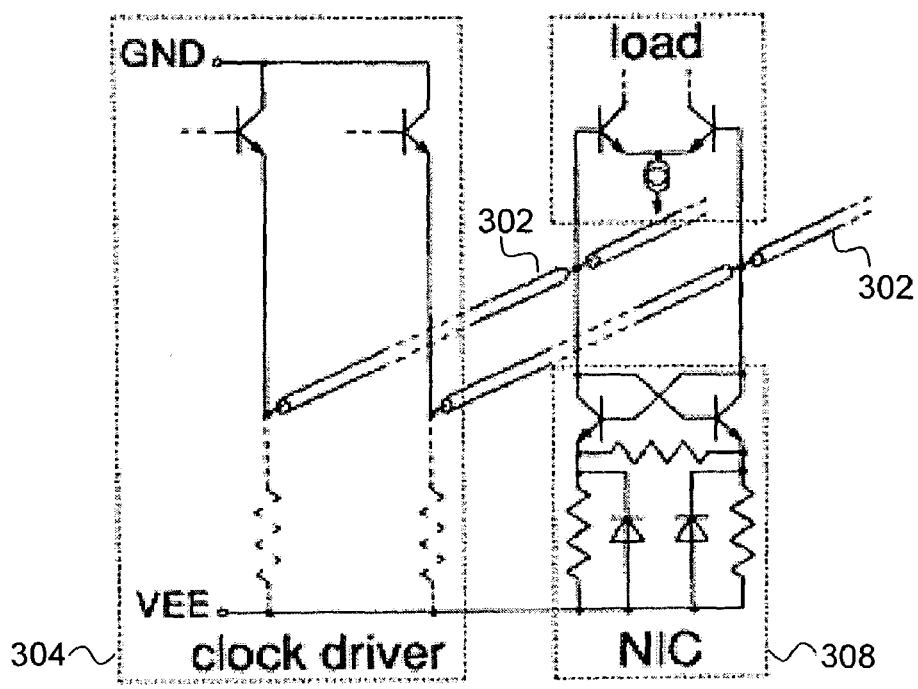
FIG. 4 illustrates one embodiment of a loss compensation unit in the form of a Negative Impedance Compensation (NIC) circuit.

FIG. 4 illustrates one embodiment of a loss compensation unit in the form of a Negative Impedance Compensation (NIC) circuit to provide a negative admittance to compensate for the loss in an interconnect.

Figure 5A:
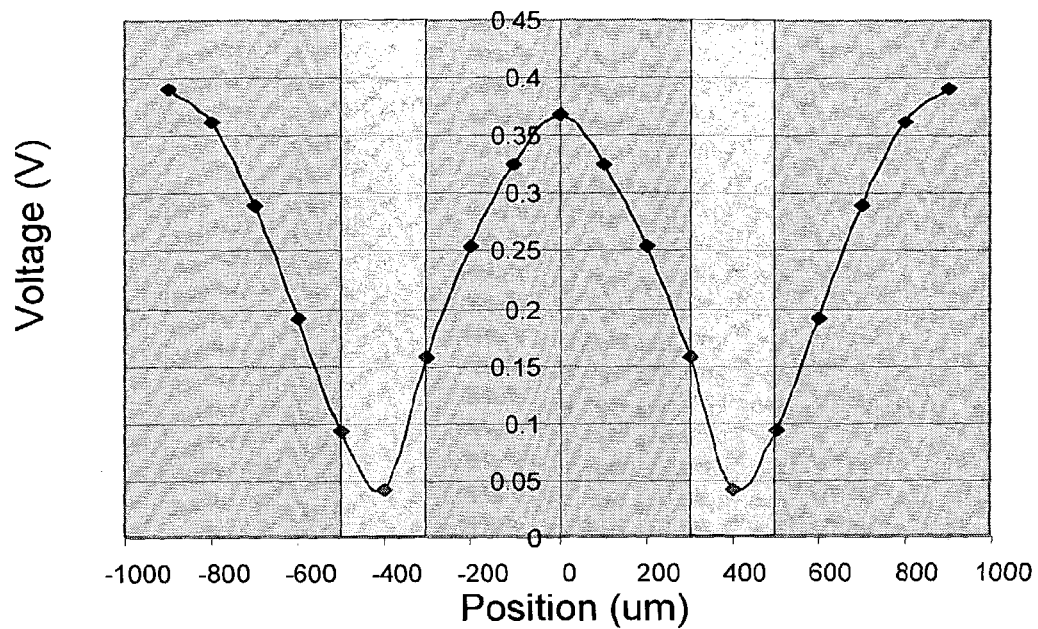
FIGS. 5A and 5B are plots illustrating various aspects of the closed-loop structure, in accordance with one embodiment of the invention.

FIG. 5A is a plot illustrating voltage as a function of position along a closed-loop structure, in accordance with one embodiment of the invention. The illustrated plot represents measurements taken from simulations of a differential transmission line for a signal operating at a frequency of 20 GHz. From the plot, the presence of nodes having near zero amplitude can be observed. It is at these nodes from which a clock signal is typically not obtainable. However, this is not a significant limitation since one or more "blind segments" corresponding to the zero amplitude nodes can be defined a-priori within signal path 202, from which the clock need not be extracted. Moreover, the positions of these blind segments typically do not change significantly with frequency, which enables using a given design at different frequencies and facilitates frequency scaling for future designs. In accordance with one embodiment, receivers that are close to a blind segment, may be fed signals extracted from two or more points of the signal path 202 to further reduce potential "blind segment" effects. In one embodiment, the two signals are obtained from points on signal path 202 that are closer than 200 µm.

Figure 5B:
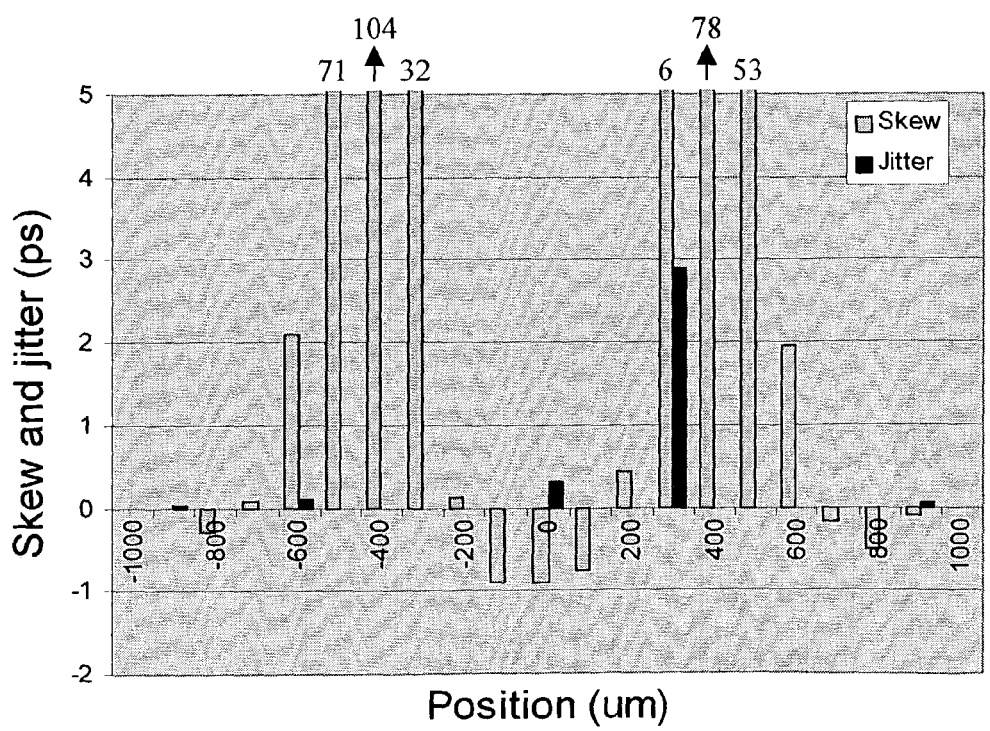

FIG. 5B is a plot illustrating clock skew and jitter as a function of position along the closed loop path, in accordance with one embodiment of the invention. With reference to FIG. 5B, it can be observed that larger amounts of clock skew are localized around positions in the closed loop that correspond to minima of the voltage plot of FIG. 5A. However, these localized high-skew points need not be used to extract the clock signal.

In one embodiment, the standing wave signal generated within the closed loop structure of signal path 202 for example, provides a low-skew chip-level clock signal that can then be converted to a digital clock and distributed locally using one or more additional clock distribution networks. FIGS. 6A-6D illustrate one or more closed loop signal paths coupled to one or more clock distribution networks in accordance with various embodiments of the invention.

In FIG. 6A, closed loop signal path 602 is coupled to a secondary clock distribution network 625 to facilitate local distribution of a digital clock signal. Although in the illustrated embodiment of FIG. 6A the secondary clock distribution network is depicted as a small (i.e. simple to balance) H-tree based distribution network, a wide variety of local clock distribution networks, including those known to be efficient over short distances, may be used.

FIG. 6B illustrates a second embodiment of a closed loop signal path. In FIG. 6B, a first closed loop signal path 622 is coupled to one or more additional closed loop signal paths 602a–602d. Due at least in part to their closed loop nature, each of the signal paths 602a–602d will oscillate in phase with signal path 622. In the illustrated embodiment, each of the closed loop signal paths 602a–602d is further coupled to one or more secondary clock distribution networks 625a–625d as shown. Although, in the illustrated embodiment of FIG. 6B the secondary clock distribution networks are represented by localized H-tree based networks, any other local clock distribution networks known to be efficient over short distances may be used. Moreover, although in FIG. 6B closed loop signal path 622 is coupled to each of the additional closed loop signal paths 602a–602d at a single location, the additional closed loop signal paths may instead be coupled at multiple locations. For example, FIG. 6C illustrates an embodiment of a closed loop signal path coupled to a second closed loop signal path at more than one location. In particular, closed loop signal path 632 is coupled to closed loop signal path 642 at more locations 635.

Figure 6D:
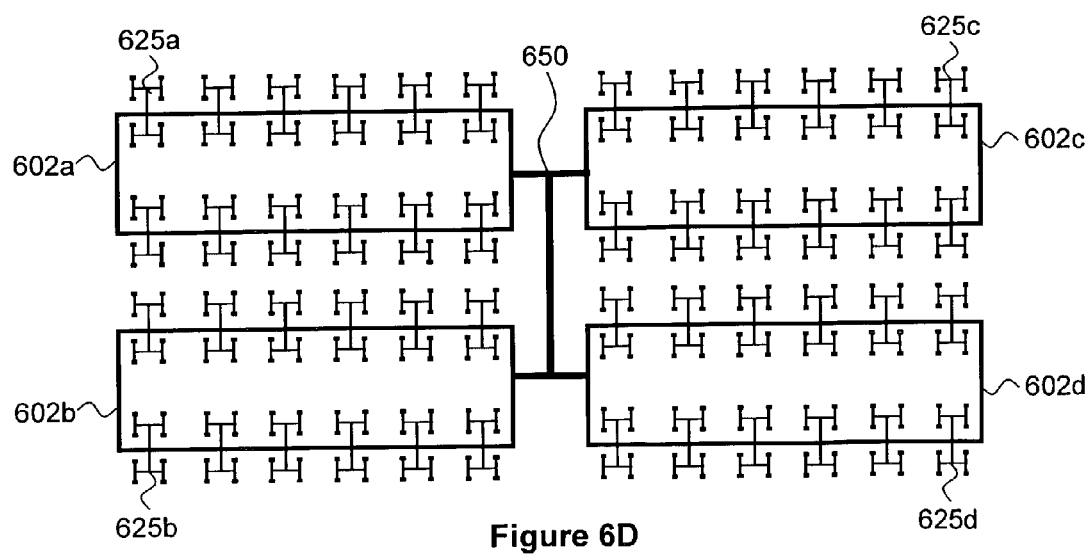

FIG. 6D illustrates a clock distribution network configured in accordance with yet another embodiment of the invention. In FIG. 6D, multiple closed loop signal paths 602a–602d are coupled together by signal path 650. In turn, each of the closed loop signal paths 602a–602d are further coupled to one or more secondary clock distribution networks 625a–625d. In one embodiment, signal line 650 approximates the form of an H-tree, while secondary clock distribution networks 625a–625d each represents H-tree based distribution networks.

Figure 7:
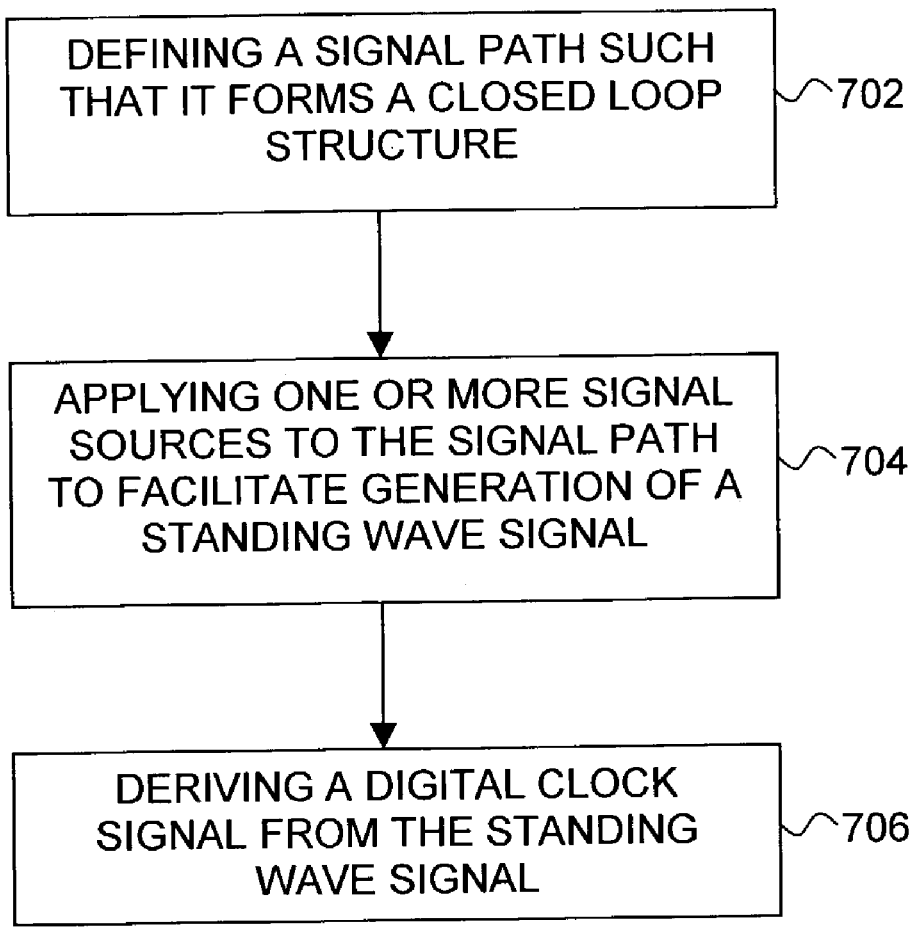
FIG. 7 is a flow diagram illustrating a method for generating a digital clock signal using a closed loop signal path in accordance with one embodiment of the invention.

FIG. 7 is a flow diagram illustrating a method for generating a digital clock signal using a closed loop signal path in accordance with one embodiment of the invention. The method may be practiced as part of circuit design and/or synthesis processes that may or may not involve execution of processing instructions. For the illustrated embodiment, the method begins at block 702 where a signal path is defined to form a closed loop structure such as that previously described herein. Next, one or more signal sources, such as a signal driver equipped to generate sinusoidal signals, is applied to the closed loop signal path to facilitate generation of a standing waveform, block 704. Finally, at block 706, a digital clock signal is derived from the standing wave signal through e.g. the use of an analog-to-digital converter.

Figure 8:
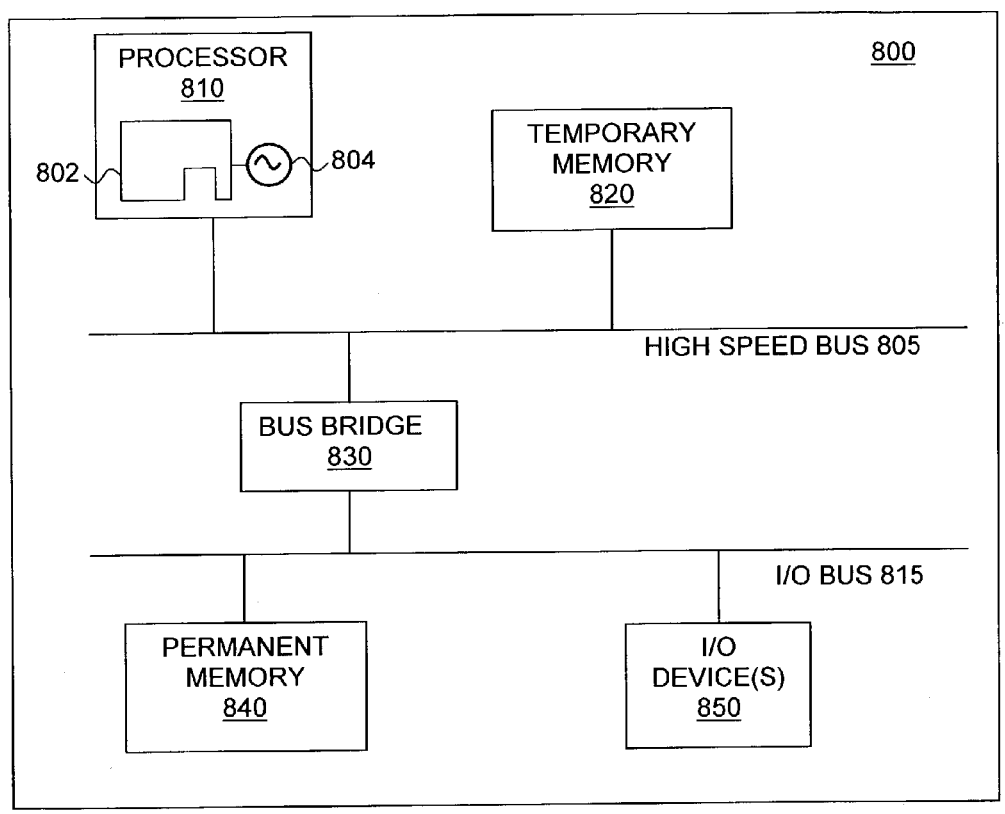
FIG. 8 illustrates one embodiment of a hardware system incorporating a signal path having a closed loop clock distribution structure in accordance with one embodiment of the invention.

FIG. 8 illustrates one embodiment of a hardware system incorporating a signal path having a closed loop clock distribution structure in accordance with one embodiment of the invention. Hardware system 800 is intended to represent a broad category of devices (whether client or server based) such as personal computers, workstations, set-top boxes, wireless mobile phones, palm sized personal digital assistants, embedded systems, as well as other general purpose or dedicated messaging devices. In the illustrated embodiment, hardware system 800 includes processor 810 coupled to high speed bus 805, which is coupled to input/output (I/O) bus 815 through bus bridge 830. In the illustrated embodiment, processor 810 is equipped with both signal path 802 disposed within a closed loop arrangement, and signal source 804 to facilitate generation of one or more clock signals in accordance with various embodiments of the invention. Hardware system 800 further includes temporary memory 820 coupled to bus 805, and permanent memory 840 which is coupled to bus 815. In one embodiment, temporary memory 820 represents volatile memory, while permanent memory 840 represents non-volatile memory, however, a wide variety of volatile and non-volatile memory configurations can be used. I/O device(s) 850 is also coupled to bus 815 and may include a display device, one or more user input devices such as a keyboard and mouse, one or more external network interfaces, etc.

Certain embodiments may include additional components, may require less than all of the above components, or may combine one or more of the above components together. For instance, temporary memory 820 may be on-chip with processor 810. Alternately, permanent memory 840 may be eliminated and temporary memory 820 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art. Additionally, a closed loop structure such as that described herein might also be used at the board level to distribute clock signals. In such a case, thick traces might be used in lieu of the loss compensation units.

EPILOG

Thus, by distributing a global clock in the form of an analog standing wave signal within a closed loop signal path (e.g. as described herein), microprocessor clock layout and design can be simplified while clock skew and jitter susceptibilities are reduced. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A circuit comprising:
   a closed looped signal path with zero termination points; and
   at least one signal source coupled to the signal path to selectively provide two signals to the signal path such that the two signals travel in opposite directions around the signal path to facilitate generation of a standing wave signal throughout the signal path.

2. The circuit of claim 1, further comprising at least one receiver to generate a digital signal based upon the standing wave signal.

3. The circuit of claim 2, wherein the at least one receiver comprises an analog to digital (A/D) converter.

4. The circuit of claim 3, wherein the at least one receiver comprises an amplitude-independent analog to digital (A/D) converter.

5. The circuit of claim 2, further comprising a signal distribution network coupled to the at least one receiver to distribute the digital signal.

6. The circuit of claim 5, wherein the signal distribution network comprises an H-tree clock distribution network.

7. The circuit of claim 2, wherein the digital signal comprises a digital clock signal.

8. The circuit of claim 1, wherein the at least one signal source produces a first and a second sinusoidal signal to travel in opposite directions of the signal path.

9. The circuit of claim 1, further comprising a second signal path arranged in a second closed loop and coupled to the first signal path to carry the standing wave signal.

10. The circuit of claim 9, further comprising a signal distribution network coupled to the second signal path to facilitate distribution of the digital clock signal.

11. The circuit of claim 1, wherein the circuit is disposed on an integrated circuit.

12. An integrated circuit comprising:
    a closed loop signal path with zero termination points;
    at least one analog signal source coupled to the signal path to selectively provide two signals to the signal path such that the two signals travel in opposite directions around the signal path to facilitate generation of a standing wave signal throughout the signal path;
    at least one receiver coupled to the signal path to generate a digital clock signal based upon the standing wave signal; and
    a clock distribution network to distribute the digital clock signal throughout the integrated circuit.

13. The circuit of claim 12, wherein the at least one receiver comprises an analog to digital (A/D) converter disposed between the signal path and the clock distribution network.

14. The circuit of claim 13, wherein the clock distribution network comprises an H-tree clock distribution network.

15. The circuit of claim 12, wherein the analog signal source produces a sinusoidal signal.

16. A method comprising:
    defining a closed loop signal path with zero termination points;
    applying at least one signal source to the signal path to selectively provide two signals to the signal path such that the two signals travel in opposite directions around the signal path to facilitate generation of a standing wave signal throughout the signal path; and
    deriving a digital clock signal from the standing wave signal.

17. The method of claim 16, wherein applying at least one signal source comprises applying One or more sinusoidal signal sources.

18. The method of claim 16, wherein the digital clock signal is locally distributed by at least one of an H-tree and a grid clock distribution network coupled to the signal path.

19. A system comprising:
    a microprocessor having
        a closed loop signal path with zero termination points, and
        at least one signal source coupled to the signal oath to selectively provide two signals to the signal path such that the two signals travel in opposite directions around the signal path to facilitate generation of a standing wave signal throughout the signal path;
    a nonvolatile memory device coupled to the microprocessor to store at least one instruction to be executed by the microprocessor; and
    a bus structure coupled to the microprocessor and the nonvolatile memory device to facilitate data transfer between the microprocessor and the nonvolatile memory.

20. The system of claim 19, wherein the microprocessor further comprises at least one receiver to generate a digital clock signal based upon the standing wave.

21. The system of claim 20, wherein the microprocessor further comprises at least one of an H-tree and a grid clock distribution network coupled to the signal path for local distribution of the digital clock signal within the microprocessor.

22. A circuit comprising:
    a closed looped signal path with zero termination points;
    at least one signal source to output a signal, the at least one signal source coupled to the signal path to facilitate generation of a standing wave signal within the signal path;
    at least one receiver to generate a digital signal based upon the standing wave signal; and
    a signal distribution network coupled to the at least one receiver to distribute the digital signal, wherein the signal distribution network comprises an H-tree clock distribution network.

23. A method comprising:
    defining a closed loop signal path with zero termination points;
    applying at least one signal source to the signal path to facilitate generation of a standing wave signal;
    deriving a digital clock signal from the standing wave signal; and
    wherein the digital clock signal is locally distributed by at least one of an H-tree and a grid clock distribution network coupled to the signal path.

24. A system comprising:
a microprocessor having
   a closed loop signal path with zero termination points, and
   a signal source to output a signal, the signal source coupled to the signal path to facilitate generation of a standing wave signal within the closed loop;
a nonvolatile memory device coupled to the microprocessor to store at least one instruction to be executed by the microprocessor; and
a bus structure coupled to the microprocessor and the nonvolatile memory device to facilitate data transfer between the microprocessor and the nonvolatile memory;
wherein the microprocessor further comprises at least one receiver to generate a digital clock signal based upon the standing wave; and
wherein the microprocessor further comprises at least one of an H-tree and a grid clock distribution network coupled to the signal path for local distribution of the digital clock signal within the microprocessor.

* * * * *

UNITED STATES PATENT AND TRADEMARK OFFICE
CERTIFICATE OF CORRECTION

PATENT NO. : 7,120,817 B2  Page 1 of 1
APPLICATION NO. : 10/447706
DATED : October 10, 2006
INVENTOR(S) : Kobrinsky et al.

It is certified that error appears in the above-identified patent and that said Letters Patent is hereby corrected as shown below:

Column 2
Line 1, "Figs 6a-6D …" should read --Figs 6A-6D...--.

Column 3
Line 50, "…Figs 6a-c), …" should read --...Figs. 6A-D), …--.

Column 6
Line 37, "…bus 805, …" should read --...high speed bus 805, …--.
Line 38, "…bus 815…" should read --...I/O bus 815. …--.
Lines 42-43, "…bus 815…" should read --...I/O bus 815 …--.

Column 8
Lines 13-14, "17. …One or more…" should read --17. ...one or more…--.
Lines 20-24, "19. ...signal oath…" should read --19. ...signal path…--.

Signed and Sealed this

Twenty-second Day of July, 2008

JON W. DUDAS
*Director of the United States Patent and Trademark Office*